(12) United States Patent
Huang (10) Patent No.: US 7,277,770 B2
(45) Date of Patent: Oct. 2, 2007

(54) DIRECT WRITE PROCESS AND APPARATUS

(76) Inventor: Wen C. Huang, 2902 28 Ave., SW., Fagro, ND (US) 58103

( * ) Notice: Subject to any disclaimer, the term of this patent is extended or adjusted under 35 U.S.C. 154(b) by 722 days.

(21) Appl. No.: 10/619,287

(22) Filed: Jul. 15, 2003

(65) Prior Publication Data

US 2005/0015175 A1 Jan. 20, 2005

(51) Int. Cl.
  *G06F 19/00* (2006.01)
  *B05D 5/00* (2006.01)
  *G05D 7/00* (2006.01)
(52) U.S. Cl. .................... 700/121; 700/282; 700/283; 216/27; 427/9
(58) Field of Classification Search ................ 700/97, 700/98, 117, 118, 119, 120, 121, 282, 283, 700/182, 281; 347/5, 6, 84; 216/27; 427/466, 427/9; 438/121; 264/401, 497
See application file for complete search history.

(56) References Cited

U.S. PATENT DOCUMENTS

| | | | |
|---|---|---|---|
| 4,665,492 A | 5/1987 | Masters | |
| 5,059,266 A | 10/1991 | Yamane et al. | |
| 5,136,515 A | 8/1992 | Helinski | |
| 5,140,937 A | 8/1992 | Yamane et al. | |
| 6,177,151 B1 | 1/2001 | Chrisey et al. | |
| 6,180,049 B1 * | 1/2001 | Jang et al. | 700/119 |
| 6,401,001 B1 * | 6/2002 | Jang et al. | 700/118 |

\* cited by examiner

*Primary Examiner*—Leo Picard
*Assistant Examiner*—Charles Kasenge (57) ABSTRACT

A direct write process and apparatus for fabricating a desired circuit component onto a substrate surface of a microelectronic device according to a computer-aided design (CAD). The process includes (a) providing a support member by which the device is supported while being fabricated; (b) providing a chamber for containing a precursor fluid material under a substantially constant pressure differential relative to the ambient pressure, with the precursor fluid material having a viscosity no less than 10 cps; (c) operating an inkjet-based dispensing head with a control valve or actuator for dispensing and depositing minute droplets of the precursor fluid material onto the substrate surface; (d) energy- or heat-treat the deposited precursor fluid material for converting it to the desired active or passive component; and (e) operating a machine controller for generating control signals in response to the CAD coordinates for controlling the position of the dispensing head relative to the support member in response to the control signals to control dispensing and depositing of the precursor material to form the desired component. The process is useful for depositing a wide range of component materials onto an electronic device, including conductor, resistor, capacitor, dielectric, inductor, antenna, solar cell electrode, battery electrode, interconnect, superconductor, sensor, and actuator element materials.

42 Claims, 6 Drawing Sheets

DIRECT WRITE PROCESS AND APPARATUS

FIELD OF THE INVENTION

This invention relates generally to a computer-controlled device-fabricating process and apparatus and, in particular, to an improved inkjet printing-based direct-write manufacturing process and apparatus for depositing desired active, passive, and other functional components to make an integrated circuit (IC) or a micro-electronic device such as a sensor, actuator, or micro-electro-mechanical system (MEMS).

BACKGROUND OF THE INVENTION

Direct write manufacturing (DWM) involves creating a pattern of active, passive and other functional components or elements directly onto a solid substrate, either by adding or removing material from the substrate, without utilizing a mask, pre-existing form, or tooling. DWM technologies were developed to answer the need of the microelectronics industry to have a means for rapidly prototyping circuit elements on various substrates. These elements are typically at the mesoscopic scale, i.e., within a size range between conventional microelectronics (sub-micron range) and traditional surface mount components (10+mm range). Although DWM may also be accomplished in the sub-micron range using electron beams or focused ion beams, these techniques are not appropriate for large scale rapid prototyping due to their small scale and, hence, low deposition rates.

One advantage of DWM technologies is the fact that it obviates the need to use a mask which is usually extremely expensive. Another advantage of such maskless processes is that they allow for electronic circuits or devices to be prototyped without iterations in the design and fabrication of photo-lithographic masks and allow for the rapid functional evaluation of circuits or devices. Still another advantage is their ability to help reduce the size of printed circuit boards and other devices through functional integration of minute active, passive and other functional elements. With DWM, it would be possible to incorporate electronic elements onto an odd-shaped substrate. Examples of interesting applications include conformal printing of communication circuits directly onto a soldier's helmet or eyeglass frame.

The direct write process can be controlled with CAD/CAM programs, thereby permitting electronic circuits to be fabricated by machinery operated by unskilled personnel or allowing designers to move quickly from a design to a working prototype. Meso-scaled DWM technologies are particularly useful in microelectronic fabrication of various circuit components. These components include (a) passive components such as insulator, resistor, capacitor, inductor, dielectric, and conductor; (b) active components such as diode, transistor, light-emitting element, electronic ink, photo-conductor, thermo-electric, superconductor, battery electrode, solar cell electrode, antenna, second harmonic generator, non-linear optic element, etc.; and (c) other functional elements such as ohmic contacts and interconnects for circuit, sensor elements, and actuator or effector elements. DWM is also useful for photolithographic mask repair, device restructuring and customization, and design and fault correction.

Prior art material-additive DWM technologies include ink jet printing, Micropen®, laser chemical vapor deposition (LCVD), focused CVD, laser engineered net shaping (LENS), laser-induced forward transfer (LIFT), and matrix-assisted pulse-laser evaporation (MAPLE). Currently known material-subtractive DWM technologies for removing material from a substrate include laser machining, laser trimming, and laser drilling.

In the "LIFT" process, a pulsed laser beam is directed through a laser-transparent target substrate to strike a film of material coated on the opposite side of the target substrate. The laser vaporizes the film material as the material absorbs the laser radiation. Due to the transfer of momentum, the material is removed from the target substrate and is redeposited on a receiving substrate that is placed in the vicinity of the target substrate. The "LIFT" process is typically used to transfer opaque thin films (typically metals), from a pre-coated laser transparent support (typically glass, $SiO_2$, $Al_2O_3$, etc.), to the receiving substrate. Due to the film material being vaporized by the action of the laser, LIFT is inherently a homogeneous, pyrolytic technique and typically cannot be used to deposit complex crystalline or multi-component materials. Furthermore, because the material to be transferred is vaporized, it becomes more reactive and can more easily become degraded, oxidized or contaminated. The method is not well suited for the transfer of organic materials, since many organic materials are fragile and thermally labile and can be irreversibly damaged during deposition. Other shortcomings of the LIFT technique include poor uniformity, morphology, adhesion, and resolution. Further, because of the high temperatures involved in the process, there is a danger of ablation or sputtering of the support, which can cause the incorporation of impurities in the material being deposited on the receiving substrate.

Similarly, the MAPLE technique (U.S. Pat. No. 6,177,151, Jan. 23, 2001 to Chrisey, et al.) also involves depositing a transfer material onto a receiving substrate. The front surface of a target substrate has a coating that comprises a mixture of the transfer material to be deposited and a matrix material. The matrix material has the property that, when exposed to pulsed laser energy, it is more volatile than the transfer material. A pulsed laser energy is directed through the back surface of the target substrate and through a laser-transparent support to strike the coating at a defined location with sufficient energy to volatilize the matrix material at the location, causing the coating to desorb from the location and be lifted from the surface of the support. The receiving substrate is positioned in a spaced relation to the target substrate so that the transfer material in the desorbed coating can be deposited at a defined location on the receiving substrate. This technique requires a separate step for the preparation of a coating on a substrate. For some intended transfer materials, it may be difficult to find a suitable matrix material that is physically and chemically compatible with the transfer material so that the "lifting" procedure can be properly carried out. Since a pulsed laser is also used in the MAPLE technique, this technique suffers from similar drawbacks that are commonly associated with the LIFT process. Heavy and expensive equipment is required in these processes.

In U.S. Pat. No. 4,665,492, issued May 12, 1987, Masters teaches a freeform fabrication technique by spraying liquid resin droplets, a process commonly referred to as Ballistic Particle Modeling (BPM) for the purpose of rapid fabrication of a 3-D concept model (but not micro-electronic device). The BPM process includes heating a supply of thermoplastic resin to above its melting point and pumping the liquid resin to a nozzle, which ejects small liquid droplets from different directions to deposit on a substrate. Sanders Prototype, Inc. (Merrimack, N.H.) provides inkjet print-head technology for making plastic or wax models.

Multiple-inkjet based rapid prototyping systems for making wax or plastic models are available from 3D Systems, Inc. (Valencia, Calif.). Model making from curable resins using an inkjet print-head is disclosed by Yamane, et al. (U.S. Pat. No. 5,059,266, October 1991 and U.S. Pat. No. 5,140,937, August 1992) and by Helinski (U.S. Pat. No. 5,136,515, August 1992). Inkjet printing involves ejecting fine polymer or wax droplets from a print-head nozzle that is either thermally activated or piezo-electrically activated.

Due to the limited allowable liquid viscosity range (typically up to 20 centi-poise, cps, only) of a printhead, 3-D inkjet printing has been limited to wax and other low-molecular weight polymers. Similarly, the print-head in a typical 2-D color image printing (onto a sheet of paper) is only capable of dispensing low-viscosity liquid such as a conventional ink which typically contains more than 99% by volume of water and less than 1% dye. These conventional print-heads for 2-D color printing or 3-D object printing are not directly amenable to the deposition of passive or active electronic components or elements onto a silicon or plastic substrate. These useful components include resistor, capacitor, dielectric, inductor, antenna, battery electrode, solar cell electrode, conductor or interconnect, and various sensor or actuator elements, etc. These components typically have too high a melting point to be workable, in a melt state, with an inkjet print-head which is constrained by a maximum operating temperature of approximately 200° C. Therefore, these components must be prepared in a precursor fluid form, which could be a metal-organic liquid (convertible to the desired component by heat and/or radiation), a solution (containing a solute component dissolved in a liquid), a suspension (solid particles dispersed but not dissolved in a liquid), or a sol-gel (colloidal fluid). These precursor fluids, when with a low solid content (or with a low proportion of the precursor material being actually converted into the final component), may be directly injectable by a conventional inkjet print-head, but resulting in extremely thin film deposited on a solid substrate. With such a low solid content fluid, it would require multiple passes (repeated dispensing and deposition onto the same area) to build a device component of a useful thickness. On the other hand, a precursor fluid containing a higher solid or desired component content normally has too high a fluid viscosity (easily greater than 20 cps) to be directly injectable by a conventional inkjet print-head.

In addition to the above-cited problem of being incapable of dispensing higher-viscosity or higher solid content fluid, the conventional inkjet printing devices suffer from the following shortcomings: (1) limited range of materials that can be inkjet printed and, hence, limited scope of application in direct writing of microelectronic components; and (2) difficulty or incapability in adjusting the fluid dispensing rate on demand or in real time during the component fabrication procedure.

Therefore, an object of the present invention is to provide an inkjet printing-based direct write process and apparatus for depositing active or passive components, in either a thin-film or a thick film form, onto a solid substrate for manufacturing a microelectronic device.

Another object of the present invention is to provide a computer-controlled process and apparatus for producing a multi-element device on a point-by-point basis.

Still another object of this invention is to provide a direct write technique that places minimal constraint on the range of materials that can be used in the fabrication of a device.

It is a further object of this invention to provide a computer-controlled device-fabricating process that does not require heavy and expensive equipment.

It is another object of this invention to provide a process and apparatus for building a CAD-defined device in which the material-dispensing rate can be readily varied on demand or in real time.

SUMMARY OF THE INVENTION

The present invention provides a direct write process and related apparatus to deposit various circuit components (e.g., active, passive, interconnect, sensor, or actuator elements, etc.) onto a solid substrate for making a micro-electronic or integrated circuit (IC) device in a point-by-point manner and, for a multiple-layer device, in a layer-by-layer manner in accordance with a design created on a computer. In one preferred embodiment, the process includes: (a) providing a support member by which the device is supported while being fabricated; (b) providing a chamber for containing a precursor fluid material under a substantially constant pressure differential relative to the ambient pressure, with the precursor fluid material having a viscosity no less than 10 cps; (c) operating an inkjet-based dispensing head, equipped with a control valve or actuator, for dispensing and depositing minute droplets of the precursor fluid material onto the substrate surface; (d) energy- or heat-treat the deposited precursor fluid material for converting it to the desired active or passive component; and (e) operating a machine controller for generating control signals in response to the CAD coordinates for controlling the position of the dispensing head relative to the support member in response to the control signals to control dispensing and depositing of the precursor material to form the desired component. The process is useful for depositing a wide range of component materials onto an electronic device, including conductor, resistor, capacitor, dielectric, inductor, antenna, solar cell electrode, battery electrode, interconnect, superconductor, sensor, and actuator element materials.

The apparatus used in the invented process is operated in such a fashion that the precursor fluid material is dispensed, on demand, preferably in a minute liquid droplet form from an orifice of the dispensing head to deposit onto a surface area of a substrate supported by the support member. A first component is deposited first, which is followed by the deposition of the second, third components, etc. Alternatively, several different components may be deposited concurrently. A first layer comprising just one type of passive or active component or several types may be deposited into a desired pattern (shape and dimensions) in accordance with a CAD design. Once the first layer becomes sufficiently rigid, a second layer of precursor fluid materials are dispensed and deposited onto the first layer and adhered thereto to fabricate the desired passive or active components for the second layer of a two-layer of multiple-layer micro-electronic device. The second layer is also of pre-determined shape and dimensions. Once the second layer of component materials become sufficiently rigid, a third layer is deposited and adhered to the second layer. These procedures are repeated until a multiple-layer device is formed, under the control of a CAD computer and associated machine controller/indexers.

In procedure (b), the substantially constant pressure is preferably readily adjustable and can be varied or adjusted prior to or during the fluid dispensing steps. The pressure variations may be achieved by a procedure that includes:

(1) operating a pumping device such as a gear pump to deliver the precursor fluid material from a reservoir to the chamber which is controlled by a valve means. This valve mean can be a piezoelectric actuator, a thermal actuation element, or an electromagnetic-driven solenoid valve. This valve means, when switched on, allows the fluid material to be dispensed through an orifice of the inkjet-based dispensing head and, when switched off, allows at least a portion of the material to flow back to the reservoir through an uniquely designed back-flow channel; and (2) operating a flow-regulating device to adjust the material back-flow rate through the back-flow channel for maintaining a desired fluid material pressure inside the chamber. The flow-regulating device may comprise a needle-like valve to adjust the effective cross-section area of the flow channel through which at least a portion of the fluid material can flow back to the reservoir. The positions of such a needle-like valve and, hence, the resulting back pressure are readily adjustable in real time by an actuator device. This back pressure, normally substantially greater than the ambient pressure (at least greater than the ambient pressure by a small magnitude, e.g., by 1 psi), is needed to propel a desired amount of liquid droplets out of the orifice. The magnitude of the required pressure differential relative to ambient pressure depends upon the viscosity and surface tension of the precursor fluid to be ejected. The flow-regulating device may comprise a spring to provide a counteracting force which the back flowing material must overcome to be able to return to the reservoir.

Alternatively, the constant but adjustable pressure may be achieved by using a compressed air source and an adjustable pressure-regulating valve. The purpose of varying the pressure imposed on the fluid material is to achieve a good control over the droplet size of the fluid material discharged out of the orifice and the volume flow rate. The volume flow rate governs the over-all device-fabricating speed. A smaller pressure, hence a smaller amount of liquid droplets ejected in a given time period, may be used to fabricate boundary or periphery areas of a component or any fine features where component dimensional accuracy is a requirement. Once the peripheries of a component or contour lines of a layer are built with good surface finish or component accuracy, the interior of a component or a layer could be quickly filled in by dispensing a larger volume of fluid material through the same orifice. This is readily accomplished in real time during the dispensing step by simply increasing the chamber pressure that drives the flow of the material. This capability makes it possible to achieve both component dimensional accuracy and fabrication rate, which are normally considered as mutually exclusive in conventional rapid prototyping or direct write technologies.

In step (d), the dispensed material may be heat- or energy-treated by a means selected from the group consisting of a ventilation fan, a vacuum pump, an air blower, a cooling device, a heater, an ultraviolet light source, an infrared source, a laser beam, an electron beam, an X-ray source, a Gamma-ray source, an ion beam source, a microwave source, an induction generator, and combinations thereof. The purpose of executing this procedure is to convert the deposited precursor material to the component of a desired composition and physical state (e.g., solid state). In the process used to fabricate a multiple-layer device, this heat treatment step brings the component materials of a layer just dispensed to a sufficiently rigid physical state so that this layer can support its own weight and the weight of subsequently deposited layers without incurring an excessive dimensional change.

In step (c), the valve means may comprise a pneumatically operated valve. In step (f), the machine control means may include servo devices for indexing and positioning the dispensing head relative to the support member in at least two dimensions and, preferably also in a third dimension.

A wide range of material compositions may be selected to make up the needed precursor material. The fluid material may comprise a volatile liquid ingredient selected from the group consisting of water, ethanol, methanol and acetone. The fluid material may be selected from the group consisting of polymeric, organic, organo-metallic, ceramic, glass, carbonaceous, metallic materials and combinations thereof. These materials, once deposited, may be heat- or energy-treated to become one of the following materials: (A) Metals, including silver, nickel, gold, copper, chromium, titanium, aluminum, platinum, palladium, and alloys thereof; (B) Ceramics, including alumina ($Al_2O_3$), silica, glasses, and mixtures thereof; (C) Dielectrics, including alumina, magnesium oxide (MgO), yttrium oxide ($Y_2O_3$), zirconium oxide ($ZrO_2$), and cerium oxide ($CeO_2$); (D) Ferroelectrics, including barium titanate ($BaTiO_3$), strontium titanate ($SrTiO_3$), lead titanate ($PbTiO_3$), lead zirconate ($PbZrO_3$), potassium niobate ($KNbO_3$), strontium bismuth tantalate ($SrBi_2Ta_2O_9$), $(Ba,Sr)TiO_3$, and solid solution stoichiometric variations thereof, (E) Piezoelectrics, including quartz, AlN, and lead zirconate titanate; (F) Ferrites, including yttrium iron garnet ($Y_3 Fe_5O_{12}$), barium zinc ferrite ($Ba_2Zn_2Fe_{12}O_{19}$), hexagonal ferrites, barium ferrite, spinel ferrites, nickel zinc ferrites, manganese zinc ferrite, and magnetite ($Fe_3O_4$); (G) Electro-optical ceramics, including lithium niobate ($LiNbO_3$), lithium tantalate ($LiTaO_3$), cadmiun telluride (CdTe), and zinc sulfide (ZnS); (H) Ceramic superconductors, including $YBa_2Cu_3O_{7-x}$ (YBCO), $Tl_2CaBa_2Cu_3O_{12}$, $La_{1.4}Sr_{0.6}CuO_3$, BiSrCACuO, BaKBiO, and halide doped fullerines; (I) Chalcogenides, including SrS, ZnS, CaS, and PbS; (J) Semiconductors, including Si, Ge, GaAs, and CdTe; (K) Phosphors, including SrS:Eu, SrS:Ce, ZnS:Ag, $Y_2O_2$:Eu, and $Zn_2SiO_4$:Mn; (L) Transparent conductive oxides, including indium tin oxide, zinc oxide, tin oxide, indium oxide, and mixture thereof, (M) Bio- and chemical sensing elements; and (N) electronic inks.

Applications and Advantages of the Present Invention:

Good Combination of Device Accuracy and Fabrication Rate: By readily adjusting the pressure imposed on the fluid material, the droplet size and the droplet volume flow rate can be adjusted on demand at any time during the fabrication process. There is no need to change the dispensing head or the discharge orifice in order to vary the component accuracy or device-fabricating rate. This is in sharp contrast to most of the prior-art direct write methods in which component accuracy and fabrication rate are mutually exclusive.

Highly Versatile Process: The present invention provides a simple yet versatile process of rapid device prototyping and manufacturing. A user is free to choose the precursor fluid materials from a wide spectrum of material compositions. Further, two or three materials may be combined to form a mixture, a composite, or a reaction product that constitutes a component with a desired combination of physical, chemical and electronic properties. There is essentially no constraint imposed on the kind of materials that can be fabricated into passive or active components of a microelectronic device.

Rapid Device Prototype Fabrication for Functional Testing: A prototype device may be designed and made to be similar or identical in both component compositions and geometric arrangement to the production device. Hence, the device prototype can be fully evaluated to verify the functional performance of a device before a photo-lithographic mask is fabricated (which is extremely expensive) or before mass production begins. This could help eliminate the possibility of producing an un-suitable mask or a large number of devices only to find out that these devices do not meet the functional requirements.

Cost-Effective Low-Volume Production Runs and Rapid Device Manufacturing: Rapid manufacturing of devices can be achieved in a more cost-effective fashion by using the presently invented process and apparatus, particularly when only a small number of identical devices (e.g., from 1 to 1,000) at a given time. With a higher back pressure, inkjet printing becomes possible essentially for most of the materials used in active or passive components commonly found in a micro-electronic device. A higher and stable back pressure leads to a much higher fluid dispensing rate. We have surprisingly found that a material deposition rate at a line speed of several meters per second is achievable with the present process and apparatus. This feature makes the present technology amenable to mass production of micro-electronic devices, not just low-volume production runs.

Simple and Less Expensive Fabrication Equipment: Polymer melts or solution are normally highly viscous and, hence, difficult to eject out of a small orifice due to a high capillarity pressure that must be overcome. A suspension with a high solid content is also highly viscous (does not flow well). The presently invented fluid material delivery assembly and printhead system now makes it possible to dispense highly viscous fluids in ultra-fine droplets. The equipment is simple, reliable, and inexpensive. For instance, one can now easily convert a 2-D inkjet printer commonly used in an office environment to become a direct-write fabricator of micro-electronic devices. Sheets of paper may simply be replaced by sheets of plastic substrate, for instance, for flexible electronic device fabrication. Commercially available 2-D inkjet printers are normally rated at an operable ink viscosity of up to 10–20 cps only. By incorporating a presently invented variable back pressure device to the ink container in a black or color ink cartridge, and by replacing the black or color inks by a precursor fluid (e.g., using a syringe needle), a 2-D inkjet printer can now print out essentially all the conceivable precursor fluid materials for micro-electronic device fabrication.

Flexible Substrate and Roll-to-Roll Fabrication of Flexible Devices: The substrate used in the present invention can be a flexible substrate such as a sheet or roll of paper, plastic, fabric or other flexile material. A roll of flexible substrate may be fed from one side of the support member into a device fabrication zone above the support member and then collected (rolled up or wound up) at another side. Such a fast process provides a means of mass producing flexible electronic devices that are wearable (as a part of a cloth) or disposable (on a sheet of paper). The process is also capable of conformal printing of communication circuits directly onto a soldier's helmet or eyeglass frame.

The applicant's colleagues Liu and Yang taught a solid freeform fabrication method and apparatus for making a 3-D object (e.g., a concept model) using an extrusion head (J. H. Liu and J. S. Yang, "Rapid Prototyping Method and Apparatus Using Readily Adjustable Constant Pressure," U.S. Patent Pending Ser. No. 09/566,093, May 5, 2000). The present invention is different and distinct from Liu and Yang's application in several aspects: (1) Liu and Yang used an extrusion head to dispense a continuous strand of fluid, but the present invention uses an inkjet printhead to eject droplets of fluid with high viscosity. (2) Liu and Yang's technology is for the fabrication of 3-D object for the concept modeling or prototyping purpose, but the present invention is for the fabrication of passive or active components of a micro-electronic device. Both material types and scopes of application in the two cases are fundamentally different. (3) Liu and Yang did not recognize the significance of depositing electronic components onto a flexible substrate such as a plastic or fabric (e.g., for building a large area electronic display, an emerging technology poised to displace or complement the current flat panel display technology). (4) Liu and Yang's process was not intended for and not suitable for roll-to-roll manufacturing of functional devices.

BRIEF DESCRIPTION OF THE DRAWINGS

FIG. 1 (a) Schematic of a direct write system capable of fabricating various passive or active components of a micro-electronic device and (b) schematic of an inkjet printhead based liquid dispensing head for ejecting fine droplets from viscous fluids.

DESCRIPTION OF THE PREFERRED EMBODIMENTS

Figure 1A:
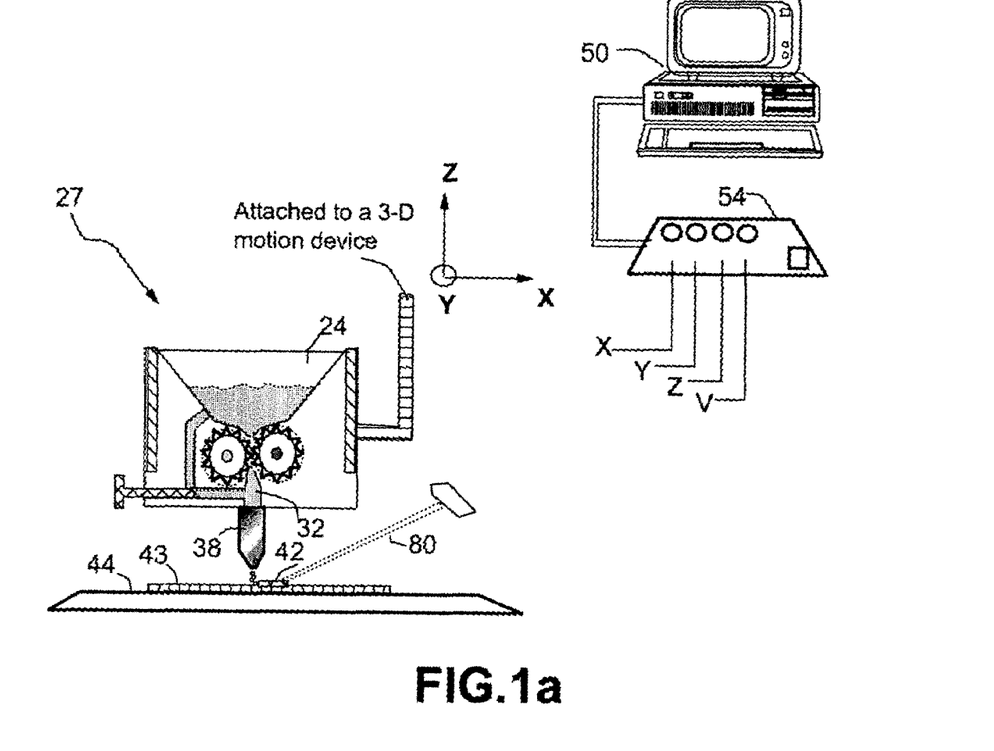
Figure 1B:
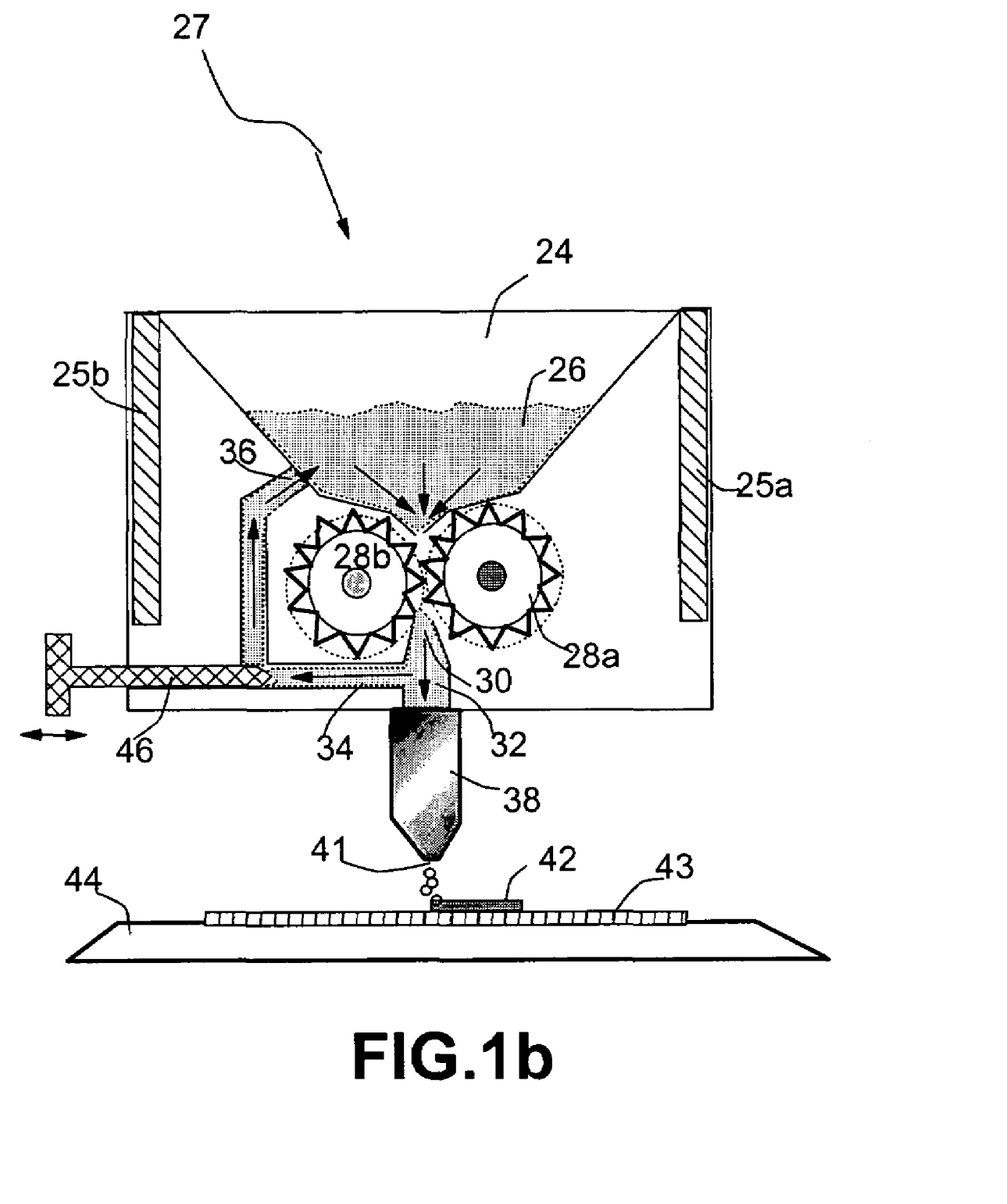

Process and Apparatus:

FIG. 1(a) illustrates one preferred embodiment of the presently invented process and apparatus for fabricating passive or active components onto a substrate surface to make a micro-electronic device, preferably on a point-by-point basis. The process begins with the creation of a computer-aided design (CAD in the form of a drawing, image, or geometry representation) of the device using a computer 50. This method further involves the operation of a system that includes computer software and control hardware, e.g., motion controller/indexer/servo 54. The system includes a support member 44 by which the device substrate 43 is supported while the device components are being deposited. The system also has an inkjet printhead-based dispensing head 38 for dispensing liquid droplets from a precursor fluid material 26. This material includes a liquid ingredient that helps to make the material in a flowable state while still residing in a chamber 32 of the dispensing head 38, which has a discharge orifice 41. The inkjet printhead-based dispensing head 38 may be equipped with a piezo-electric actuator (such as in a piezo-ceramic based inkjet printer), thermal actuation element (such as in a bubble jet based printer), or an electromagnetic-driven coil and magnetic piston (such as in a miniature solenoid valve) as a control valve means for micro-dispensing. A fluid material delivery assembly 27 (FIG. 1(*b*)) supplies a precursor fluid material of constant but adjustable back pressure to a chamber inside the inkjet printhead (e.g., ink container in an ink cartridge of an office color printer). The assembly 27 has optional heating elements 25*a*,25*b* to help the fluid material in the reservoir 24 and chamber 32 maintain a desired constant temperature. This back pressure makes it possible for an inkjet printhead to eject droplets of highly viscous fluids.

A precursor fluid material is dispensed onto a surface of the device substrate 43 to form a desired pattern of the deposited material 42. A material treatment means 80 is used to convert the precursor fluid material into the component of a desired material composition and cause the material to become sufficiently rigid, solid state, so that the material can support its own weight and, in a multiple-layer device, the weight of other layers subsequently added to this layer. This material treatment means 80 could include using (1) a ventilation fan, air blower or cooling device to cool down a hot melt material, (2) a vacuum pump or an air blower to facilitate vaporization of any volatile ingredient that makes up the fluent portion of the material (e.g., to vaporize water in a water soluble polymer), (3) a heater, ultra-violet light, or other high-energy sources to chemically cure a hardenable resin, and combinations thereof. This treatment means could involve simply leaving the material dispensed onto the support member surface in the ambient temperature to naturally solidify or become rigid. In one preferred embodiment, these procedures are repeated to deposit a second (and third, fourth, etc.) passive or active component of a device onto the same substrate surface to form a first layer of the device. Once the first layer becomes sufficiently rigid, a second layer of fluid materials is dispensed and deposited onto the first layer and adhered thereto. Once the second layer of material becomes sufficiently rigid, a third layer is deposited. These procedures are repeated until a multi-layer device is formed.

The precursor fluid material in a chamber 32 is supplied, intermittently or continuously, from a material delivery assembly 27 containing a device such as a screw extruder, gear pump, metering pump, positive displacement valve, and air pump (pneumatically operated pump) to maintain a constant but adjustable pressure in the chamber 32. Shown in FIG. 1(*a*) and FIG. 1(*b*) is an example of such a delivery means which includes a gear pump 28*a*,28*b* that is driven through a drive shaft by an electric motor (not shown). When driven in motion, the gear pump delivers a controlled rate of the precursor fluid material 26 from a material reservoir 24 through an outlet 30 into the chamber 32. When the control valve means inside the inkjet printhead 38 is switched on (e.g., by sending a train of high-voltage pulses to the piezo-ceramic actuator element attached to the printhead body), a desired amount of fluid material is discharged out of the orifice 41 in the form of minute droplets. These droplets are deposited onto a surface of the device substrate 43 disposed on a support member 44. The flow direction of the precursor fluid material from the chamber 32 to the dispensing head is referred to as forward flow, designated by the letter F in FIG. 2 and FIG. 3, when the control valve means (e.g., based on a piezo-ceramic actuator) is switched on.

If the control valve means is switched off, at least a portion of this fluid material in chamber 32 will flow through a channel 34A,34B and an outlet 36 back into the reservoir 24. The back flow direction is designated by a letter B in FIG. 2 and FIG. 3. The back flow rate of the precursor fluid material is adjustable by a pressure-regulating means, such as a needle-like valve 46 that is inserted into the back-flow channel 34A,34B to a desired position. The cross-section area of channel 34A,34B through which the material can back flow is effectively adjusted by this position, which can be readily changed by using an actuator, e.g., a linear motion device 53 powered by a stepper motor 52.

Figure 2:
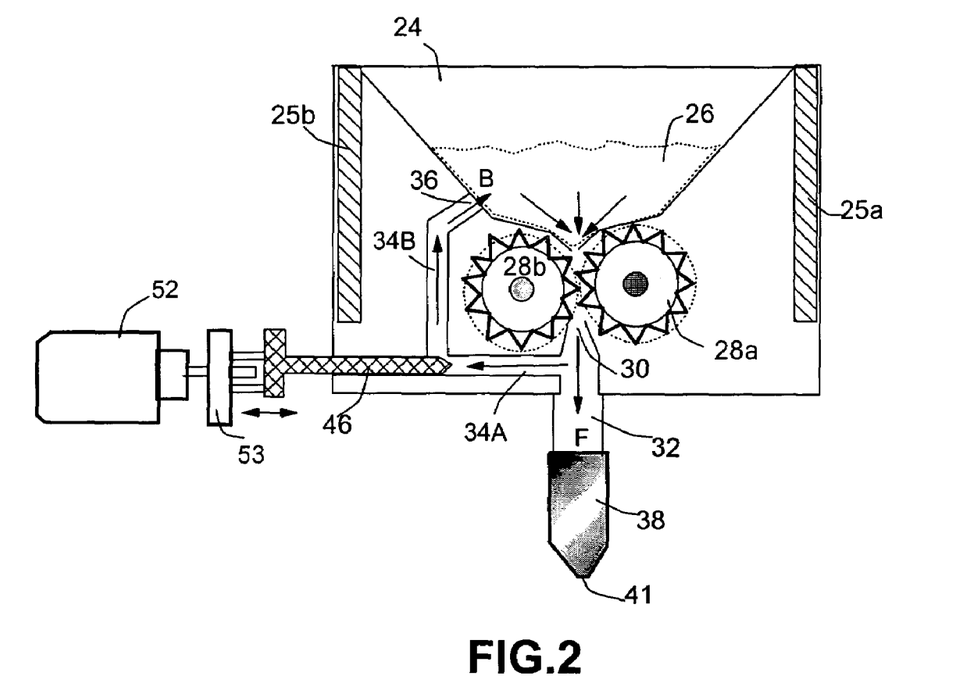
FIG. 2 Schematic of a material delivery assembly of a direct write system. An actuator-regulated needle valve is used to adjust the back flow rate and, hence, the chamber pressure of the fluid material.
Figure 3:
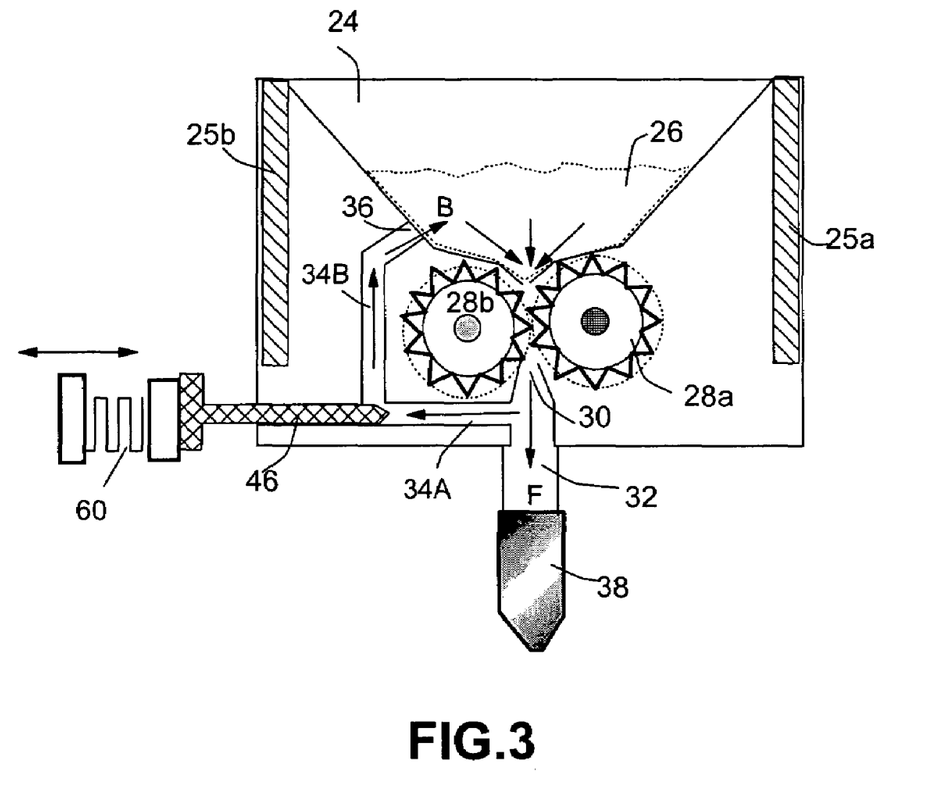
FIG. 3 Schematic of a material delivery assembly of a direct write system. A spring-regulated needle valve is used to adjust the chamber pressure of the fluid material.

With a larger cross-section area (the needle 46 being inserted into the channel 34A,34B to a shallow position) the material back-flow rate from 34A to 34B, and re-entering the reservoir, is higher. With the pumping of a given volume rate of fluid material into chamber 32, this higher back-flow rate produces a lower cumulative pressure differential for the fluid material in chamber 32. This pressure differential relative to the ambient pressure serves as the driving force for dispensing the fluid material through the head 38 when the control valve is open. With a given orifice size, a lower pressure differential leads to a lower flow rate and smaller droplet size of the fluid material discharged from the orifice. This feature of a smaller droplet size and a lower flow rate is desirable when a higher component accuracy is required.

In contrast, if the cross-section area is smaller (with the needle 46 being deep into the channel 34A,34B, leaving behind a smaller gap) the material back-flow rate from 34A to 34B, and re-entering the reservoir, is lower. This lower back-flow rate produces a higher cumulative pressure differential for the fluid material in chamber 32. The driving force for dispensing the fluid material through the head 38, when the control valve is open, is now higher, resulting in an increase in the droplet size and the fluid material flow rate through the orifice 41. The component-depositing rate can be easily enhanced in this manner. It should be noted that such a pressure change can be readily changed instantaneously, on demand, at any time during the device-fabricating process without having to replace the orifice with a larger-diameter one. There is, therefore, no need to use more than one discharge orifice to deposit a component material with an improved rate.

It may also be noted that a smaller droplet size (lower pressure differential) may be used when building the boundary areas (e.g., near a wall or a surface) or where finer features are desired. The pressure can be instantaneously increased to enhance the volume flow rate when filling an internal space with the material. As opposed to prior-art direct write techniques where the component accuracy and component-depositing rate are mutually exclusive, the present invention provides an effective and convenient way to achieve both accuracy and fabrication rate with a non-complicated material dispensing system design.

The present process includes operating a CAD computer 50 for generating control signals in response to coordinates of the design of this object and operating the controller/indexer 54 for controlling the position of the dispensing head relative to the support member in response to the control signals. The movements of the dispensing head relative to the support member preferably are executed to move first in an X-Y plane defined by a first (X-) direction and a second (Y-) direction. During the steps of moving the dispensing head relative to the support member, the dispensing head 38 is also controlled to dispense the fluid material, continuously or intermittently, for depositing a portion of a component while the substrate is supported with the support member 44. The procedures are repeated to complete the deposition of a component in a desired pattern and then, in a multi-component layer, the deposition of all other components in a layer. Once a layer of the device is built, the head and the support member are moved away from each other by a predetermined thickness distance in a third direction (or Z-direction, orthogonal to both X- and Y-directions) to get ready for fabricating a second layer. These procedures are repeated for fabricating successive layers of a multiple-layer device.

FIG. 3 schematically shows another example of how the back-flow rate or the fluid material pressure in chamber 32 can be regulated. A spring 60 with a desired spring force is used to provide a counteracting pressure against the back flow pressure when the needle valve 46 is in a "closed" position. With continued pumping of the fluid material into chamber 32, the pressure therein is cumulated until the resulting back-flow force exceeds the imposing spring force. At this moment, the needle valve is pushed open, allowing material back flow to occur. This constant pressure can be readily adjusted by adjusting the spring force, for instance, through compressing the spring 60 to a different extent.

Figure 4:
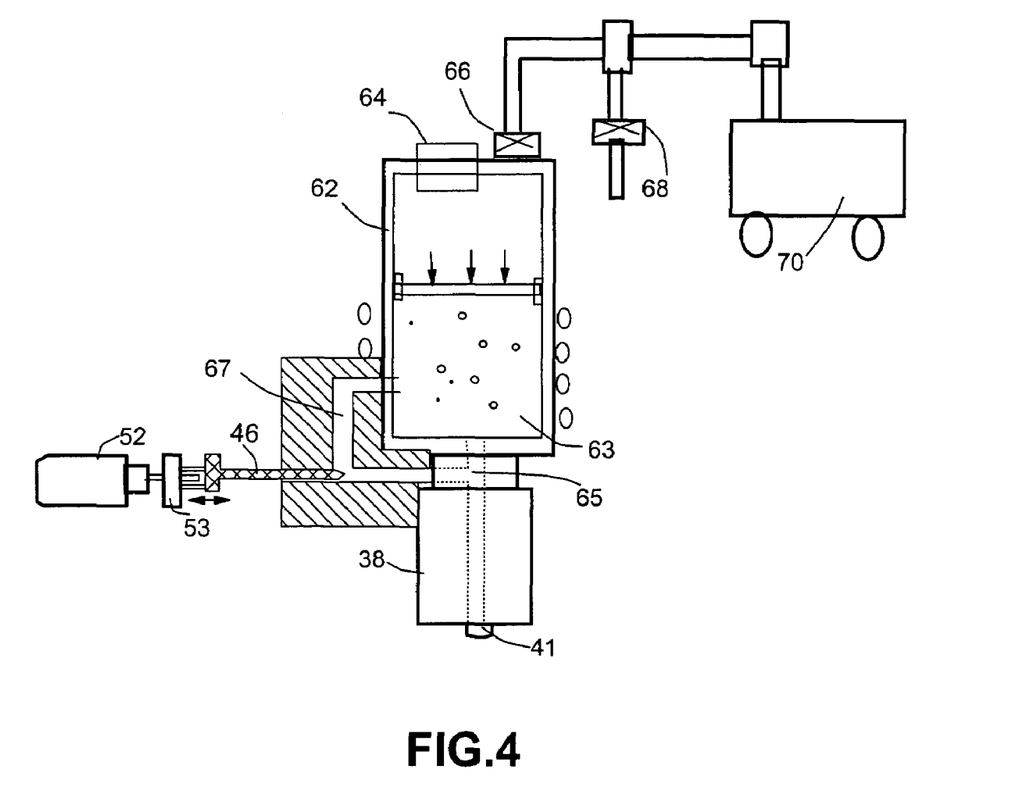
FIG. 4 Schematic of a material delivery assembly of a direct write system. The chamber pressure of the fluid material is regulated by an adjustable valve and air compressor.
Figure 5:
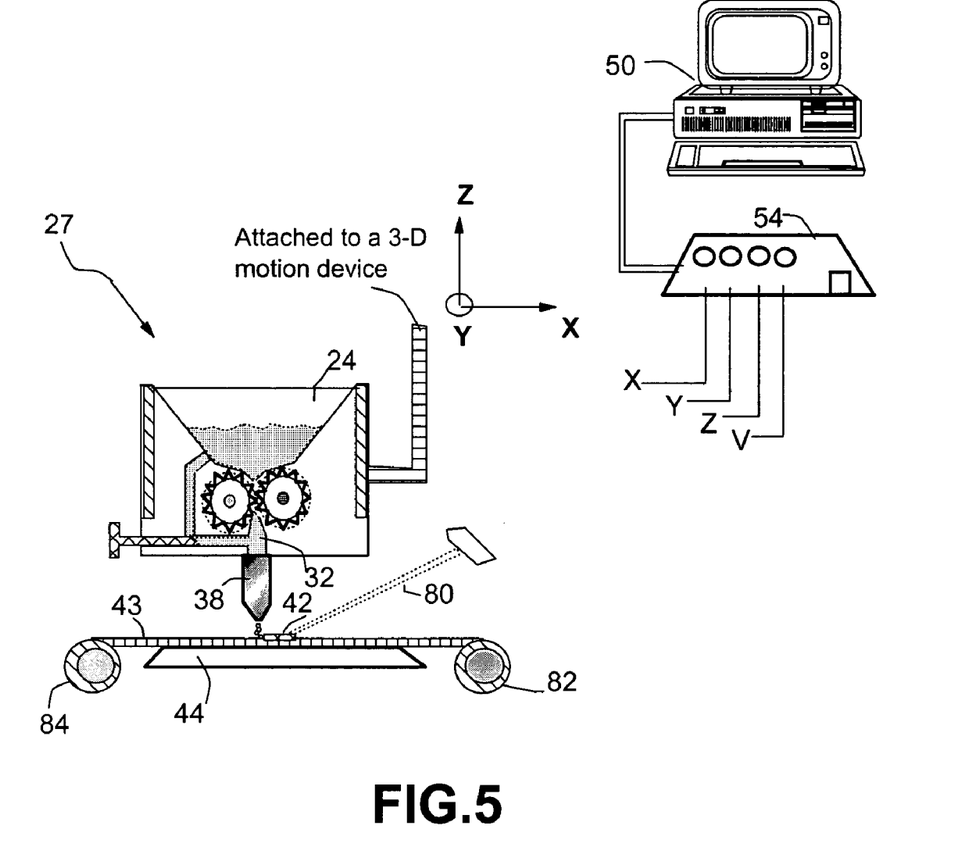
FIG. 5 A diagram illustrating a roll-to-role fabrication process for microelectronic devices.

FIG. 4 schematically shows another fluid material delivery assembly in which the dispensing pressure can be maintained constant and can be readily changed. A compressed air source 70 supplies pressurized air through an adjustable valve 66 into the upper portion of a sealed container 62. The lower portion of this container 62 is a reservoir 63, which supplies a fluid material to a chamber 65. A safety valve 68 is installed in the pipe line for releasing the pressure when needed. The precursor fluid material may be replenished into the reservoir through a feed-through access 64 when needed. Optional heating elements may be provided to maintain the material in the reservoir in a fluid state of a proper viscosity valve. When the pressure-regulating valve 66 is switched open, the fluid material is under a constant pressure. When the control valve in the inkjet printhead 38 is turned on, a constant flow of droplets is discharged through an orifice 41. A needle-valve 46 and a back-flow channel 67 are used to readily adjust the back pressure in chamber 65 any time before, during or after the liquid dispensing step. Again, with a lower air pressure, the flow rate is smaller with smaller-sized liquid droplets coming out of the orifice, resulting in a higher part accuracy. If the air pressure is increased on demand, a higher flow rate leads to a greater over-all component-depositing rate.

In another preferred embodiment, at least another dispensing head may be installed for dispensing a different fluid material. This second head may be of the same type as or different from the first head. Such a second head (or a plurality of heads) may be desirable when an operator chooses to use different materials to fabricate different components or to combine different materials to produce a component of a device. A dispensing head of multiple orifices may also be used in practicing the present invention.

The substrate may be selected from the group of flexible materials consisting of a plastic, elastomer, fabric, paper, composite, and combinations or mixtures thereof. Advantageously, the substrate may be prepared in a roll form. The invented process further includes the steps of continuously or intermittently moving a substrate from a roll of substrate supply disposed at one side of the support member into a fabrication zone above the support member and then out of the fabrication zone upon deposition of the component(s). Preferably, the process further includes a step of collecting the substrate at another side of the support member to complete a roll-to-roll fabrication process.

Another preferred embodiment of the present invention is an inkjet printhead-based fluid dispensing apparatus which includes (A) a fluid material reservoir; (B) an inkjet printhead body comprising therein a chamber having a first end in flow communication with the reservoir and receiving a fluid material therefrom and on a second end a discharge orifice for ejecting droplets of a fluid material therethrough; (C) a valve means in control relation to the discharge orifice; and (D) a back-flow channel having one end in flow communication with the chamber and another end in flow communication with the reservoir. The printhead body may comprise a solenoid valve body and the valve means comprises an electromagnetic valve. The printhead body may contain a conventional office inkjet printhead with the valve means comprising either a piezo-electric actuator or a thermal actuation element. The back-flow channel may be controlled by a flow-rate regulator means, such as a needle valve.

Still another preferred embodiment of the present invention is a direct write apparatus for fabricating a desired active or passive component onto a substrate surface of a microelectronic device according to a computer-aided design (CAD). The apparatus comprises: (a) a support member for supporting thereon the device substrate; (b) a fluid material delivery assembly comprising a chamber at a distance from the support member for containing a precursor fluid material under a substantially constant but adjustable pressure differential relative to the ambient pressure; (c) an inkjet-based dispensing head in flow communication with the chamber, where the head comprises on one end at least a discharge orifice of a predetermined size and a valve means in control relation to the at least a discharge orifice for dispensing droplets of the precursor fluid material through the orifice onto the substrate surface; and (d) machine control means in electronic communication with a computer and in control relation to both the support member and the dispensing head for generating control signals in response to coordinates of the design of the device and for controlling the position of the dispensing head relative to the support member in response to the control signals to control dispensing of the precursor fluid material for fabricating the component.

Preferably, the fluid material delivery assembly further comprises: (i) a fluid material reservoir containing therein a desired amount of the precursor fluid material, (ii) a pump means to deliver the precursor fluid material from the reservoir to the chamber; (iii) a back flow channel having a first end in flow communication with the chamber and a second end in flow communication with the reservoir; and (iv) a flow-regulating means in control relation to the channel to adjust the material back-flow rate through the channel for maintaining a desired fluid material pressure inside the chamber.

Additional Process Details and Needed Hardware:

The process involves intermittently or continuously dispensing droplets of a precursor fluid material through an orifice of a dispensing head to deposit onto a substrate surface on a support member. During this dispensing procedure, the support member and the dispensing head are moved (preferably under the control of a computer and a controller/indexer) with respect to each other along selected directions in a predetermined pattern on an X-Y plane defined by first (X-) and second (Y-) directions and along the Z-direction perpendicular to the X-Y plane. The three mutually orthogonal X-, Y- and Z-directions form a Cartesian coordinate system. These relative movements are effected so that the fluid material can be deposited essentially point by point and layer by layer to build a multiple-layer device according to a computer-aided design (CAD) drawing of a device.

In one preferred embodiment, an optional heating provision (e.g., heating elements) is attached to, or contained in, the dispensing head to control the physical and chemical state of the material; e.g., to help maintain it in a fluent state. A temperature sensing means (e.g. a thermocouple) and a temperature controller can be employed to regulate the temperature of the nozzle. Heating, cooling, or energy means (UV, IR, electron beam, laser beam, ion beam, X-ray, Gamma-ray, etc.) may be used to induce physical changes (e.g., vaporization or solidification) or chemical reactions (e.g., curing, polymerization, hardening, etc.). Heating, cooling, and energy means are well known in the art.

Referring again to FIG. 1, the support member 44 is located in close, working proximity to, but at a predetermined initial distance from, the dispensing head 38. The support member and the dispensing head are equipped with mechanical drive means for moving the support member relative to the movable dispensing head in three dimensions along "X," "Y," and "Z" axes in a predetermined sequence and pattern, and for displacing the nozzle a predetermined incremental distance relative to the support member. This can be accomplished, for instance, by allowing the support member and the dispensing head to be driven by three linear motion devices powered by three separate stepper motors. Linear motion devices or X-Y-Z gantry tables are well known in the art.

A preferred embodiment of the present invention is a direct write process in which the execution of various steps is controlled by a CAD computer. The device fabrication process begins with the creation of a mathematical design or model (e.g., via computer-aided design, CAD), which is a data representation of a device. This model is stored as a set of numerical representations of layers which, together, represent the whole device. A series of data packages, with each data package containing information (segments or data points) related to the physical dimensions, shape and material composition of an individual component in a layer, is stored in the memory of a computer in a logical sequence.

The three-dimensional motion controller is electronically linked to the mechanical drive means and is operative to actuate the mechanical drive means (e.g., those comprising stepper motors) in response to "X", "Y", "Z" axis drive signals for each layer received from the CAD computer. Controllers that are capable of driving linear motion devices are commonplace. Examples include those commonly used in a milling machine.

By slicing through a CAD model of a device, one can obtain coordinate points that define the boundaries of each cross section. It is therefore convenient for a dispensing head to follow these coordinate points to trace out the perimeters of a component in a layer or the peripheral contour lines in a layer cross section. These perimeters may be built with high accuracy by setting the material chamber pressure at a relatively low value to ensure smaller-size droplets of material being discharged out of the orifice at a lower volume flow rate. These considerations have led to the development of another embodiment of the present invention. This is a process as set forth in the above-cited process, wherein the moving step includes the step of moving the dispensing head and the support member relative to one another in a direction parallel to the X-Y plane according to a first predetermined pattern to form an outer boundary of one selected material composition or a distribution pattern of different material compositions onto the support member. The outer boundary defines an exterior surface of the object.

Another embodiment of the present invention includes a process as set forth in the above paragraph, wherein the outer boundary defines an interior space of a component in the device, and the moving step further includes the step of moving the dispensing head and the support member relative to one another in one direction parallel to the X-Y plane according to at least one other predetermined pattern to partially or completely fill this interior space with a selected material composition at a higher chamber pressure for an improved component-depositing speed. The interior space does not have to have the same material composition as the exterior boundary. This process may further comprise the steps of (1) creating a geometry of the device on a computer with the geometry including a plurality of segments or data points defining the device and material compositions to be used; and (2) generating program signals corresponding to each of these segments or data points in a predetermined sequence, wherein the program signals determine the movement of the dispensing head and the support member relative to one another in the first predetermined pattern and at least one other predetermined pattern.

Materials:

The precursor fluid material can be selected from a wide variety of material compositions, including organic, polymeric, metallic, ceramic, carbonaceous, glass, organo-metallic, and combinations thereof. The fluid material may be in a hot melt (e.g., thermoplastic), a liquid containing a liquid soluble second component (e.g., a water-soluble polymer dissolved in water or a mixture or water and alcohol), or a liquid containing a non-soluble second component (e.g., ceramic powder dispersed in a polymer melt). The fluid material may contain a thermosetting resin that, once dispensed and deposited, can be cured by using a heat source, an ultra violet light, and/or other high energy source. Thermoplastic and lower-melting metallic melts are particularly easy to handle. They can be readily heated to become a melt and cooled to rapidly solidify. In the case of polymer-containing solution, a portion of the volatile liquid component (e.g., water and/or alcohol) may be removed after the fluent material is dispensed onto the substrate.

The fluid material does not have to be a hot melt. It may be composed of a liquid ingredient, a primary component-building material, and other optional additives or co-reactants. The material may contain a primary component-building material that is soluble in a volatile liquid ingredient: e.g., a polymer soluble in a solvent. The solvent will keep the material composition in a fluid state inside the chamber of the dispensing head. Part of this solvent can be rapidly removed after the material is discharged out of the orifice. Removal of this solvent can be facilitated by subjecting the device fabrication zone to a ventilation treatment (e.g., using a ventilation fan to blow the solvent off or a vacuum pump to pump out the solvent). When a certain amount of the solvent is removed, polymer molecules are precipitated out to form a cohesive phase, making the material composition thick and consistent (with a sufficiently high viscosity to become rigid).

The material may contain a primary device component-building material in the form of discrete particles that can be dispersed, but not dissolved in the volatile liquid ingredient: e.g., conductive graphite powder dispersed in acetone. The solvent, acetone, will keep the material composition in a fluent state inside the chamber of a dispensing head. Part of this solvent can be rapidly removed after the material composition is discharged out of the orifice. When a majority of the solvent is removed, the particles make the material composition thick and consistent (with a sufficiently high viscosity to become rigid).

In these materials, the volatile ingredient is preferably a fast vaporizing liquid such as ethanol, methanol, and acetone; a non-toxic material (e.g., alcohol) having a high vapor pressure at room temperature is most desirable.

The substrate surface can be any material, planar or non-planar onto which one may wish to deposit liquid droplets. The device substrate may be any solid material including, but not limited to, silicon, glass, plastics, fabric, cloth, paper, metals, and ceramics. The present invention is particularly useful in creating electronic devices such as passive and active components of printed circuit boards (PCBs) or in creating chemo-selective coatings for chemical sensors such as surface acoustic wave (SAW) resonators.

Specific to various applications, the material for direct write manufacturing of a device can be any material that one may wish to deposit on a substrate in a defined pattern, including, but not limited to the following:

(A) Metals, including, but not limited to silver, nickel, gold, copper, chromium, titanium, aluminum, platinum, palladium, etc., and alloys thereof. These materials are particularly useful for interconnects or conductor elements;

(B) Ceramics, including, but not limited to alumina ($Al_2O_3$), silica and other glasses, which are good for insulator elements;

(C) Dielectrics, including, but not limited to alumina, magnesium oxide (MgO), yttrium oxide ($Y_2O_3$), zirconium oxide ($ZrO_2$), cerium oxide ($CeO_2$), etc., which are good for insulator or capacitor elements;

(D) Ferroelectrics, including, but not limited to barium titanate ($BaTiO_3$), strontium titanate ($SrTiO_3$), lead titanate ($PbTiO_3$), lead zirconate ($PbZrO_3$), potassium niobate ($KNbO_3$), strontium bismuth tantalate ($SrBi_2Ta_2O_9$), (Ba, Sr)$TiO_3$, and solid solution stoichiometric variations thereof, etc., which are useful for sensor and capacitor elements;

(E) Piezoelectrics, including, but not limited to the above mentioned ferroelectrics, quartz, AlN, etc., which are useful for sensor and actuator applications (e.g., surface acoustic wave device);

(F) Ferrites, including but not limited to yttrium iron garnet ($Y_3 Fe_5O_{12}$), barium zinc ferrite ($Ba_2Zn_2Fe_{12}O_{19}$), hexagonal ferrites such as barium ferrite, spinel ferrites such as nickel zinc ferrites, manganese zinc ferrite, magnetite ($Fe_3O_4$), etc., which are useful for magnetic elements;

(G) Electro-optical ceramics, including, but not limited to lithium niobate ($LiNbO_3$), lithium tantalate ($LiTaO_3$), cadmiun telluride (CdTe), zinc sulfide (ZnS), etc., which are useful for electro-optic device elements such as light-emitting diodes and flat panel display substrates;

(H) Ceramic superconductors, including, but not limited to $YBa_2Cu_3O_{7-x}$ (YBCO), $Tl_2CaBa_2Cu_3O_{12}$, $La_{1.4}Sr_{0.6}CuO_3$, BiSrCACuO, BaKBiO, halide doped fullerines, etc.;

(I) Chalcogenides, including, but not limited to SrS, ZnS, CaS, PbS, etc., which are useful as energy conversion elements such as solar cells;

(J) Semiconductors, including, but not limited to Si, Ge, GaAs, CdTe, etc.;

(K) Phosphors, including, but not limited to SrS:Eu, SrS:Ce, ZnS:Ag, $Y_2O_2$:Eu, $Zn_2SiO_4$:Mn, etc. and transparent conductive oxides, including, but not limited to indium tin oxide, zinc oxide, etc.;

(L) Bio- and chemical sensing elements;

(M) electronic inks.

In an electronic device, the materials to be deposited should have particular desired electronic properties. Examples of electronic materials include metals, dielectrics, ferroelectrics, ferrites, ferrimagnets, ferromagnets, semiconductors, phosphors and electrically conducting organic polymers.

In the fabrication of a component of a chemical or biological sensor, the materials to be deposited should be able to interact selectively with a particular chemical or biological analyte. It is well known in the art that the chemically selective material may be a polymer with hydrogen bond acidic properties, a polymer with hydrogen bond basic properties, a dipolar polymer, a polarizable polymer, or a non-polar polymer, depending on the characteristics of the analyte of interest. Examples of chemo-sensing element materials include SXFA (poly(oxy{methyl[4-hydroxy-4,4, bis(trifluoromethyl)but-1-en-1-yl]silylene})), P4V (poly(4-vinylhexafluorocumyl alcohol). Other examples include perfluoro-polyethers terminated with a variety of functional groups such as $CF_3$, $CH_2OH$, polyethylene imines, polysiloxanes, alkylamino pyridyl substituted polysiloxanes, polytetrafluoroethylene, polysilanes, polyesters, polyvinylaldehydes, polyisobutylene, polyvinylesters, polyalkenes, zeolites, aerogels, porous carbon, metals, silicalites, clay materials, cellulose materials, polyanilines, polythiophenes, polypyrroles, fullerenes, cyclodextrins, cyclophanes, calixeranes, crown ethers, and organic dyes.

Examples of biochemical species that can be deposited with the present direct write technology include proteins, oligopeptides, polypeptides, whole cells, biological tissue, enzymes, cofactors, nucleic acids, DNA, RNA, antibodies (intact primary, polyclonal, and monoclonal), antigens, oligosaccharides, polysaccharides, oligonucleotides, lectins, biotin, streptavidin, and lipids.

The substrate may be deposited with a component of a physical sensing device, such as a magnetic sensor, optical sensor, temperature sensor, pressure sensor or gas flow sensor element. The material to be deposited may then be an appropriate sensing material, such as a magnetic sensing material, optical sensing material, temperature sensing material, pressure sensing material or gas flow sensing material. Examples of physical sensing materials to be deposited include materials that make up individual layers of magnetic-nonmagnetic multi-layers or resonant magnetic oscillators for magnetic sensing, thin film thermocouples for temperature sensing, piezo-electric films or resonators for pressure sensing and simple resistive heater-thermocouple combinations for gas flow sensing.

What is claimed:

1. A direct write process for fabricating a desired circuit component onto a substrate surface of a microelectronic device according to a computer-aided design (CAD), said process comprising:
   (a) providing a support member by which said device substrate is supported while said component is being fabricated;
   (b) providing a chamber for containing a precursor fluid material under a substantially constant pressure differential relative to the ambient pressure, said precursor fluid material having a viscosity no less than 10 centipoises (cps);
   (c) operating an inkjet-based single-orifice or multiple-orifice dispensing head for dispensing and depositing minute droplets of said precursor fluid material through at least one discharge orifice onto said substrate surface, said dispensing head having valve means in control relation to said dispensing head for switching said head on and off on demand;

(d) operating a material treatment means to convert said deposited precursor material to said desired component; and (e) operating machine control means for generating control signals in response to coordinates of said CAD and for controlling the position of said dispensing head relative to said support member or said substrate in response to said control signals to control dispensing and depositing of said precursor material to form said component of a desired shape and dimension on said substrate surface.

2. The process of claim 1 wherein said substantially constant pressure differential is variable and is varied by a method comprising:

operating a pump means to deliver said precursor fluid material from a reservoir to said chamber, wherein said valve means, when switched on, allows said fluid material to be dispensed through said dispensing head and, when switched off, allows at least a portion of said fluid material to flow back to said reservoir through a flow channel; and operating a flow-regulating means to adjust a fluid material back-flow rate through said flow channel for maintaining a desired fluid material pressure inside said chamber.

3. The process of claim 2 wherein said pump means comprises a device selected from the group consisting of a gear pump, an extruder, a piston, a positive displacement pump, an air pump, a motor-driven linear motion device, an actuator, or combinations thereof.

4. The process of claim 2 wherein said flow-regulating means comprises a needle-like valve to adjust an effective cross-section of said flow channel through which said at least a portion of fluid material flows back to said chamber.

5. The process of claim 2 wherein said flow-regulating means comprises a spring.

6. The process of claim 4 wherein the position of said needle-like valve is adjustable and is adjusted by using an actuator means prior to or in real time during step (c).

7. The process of claim 1 or 2, wherein said material treatment means is selected from the group consisting of a ventilation fan, a vacuum pump, an air blower, a cooling device, a heater, an ultraviolet light source, an infrared source, a laser beam, an electron beam, an X-ray source, a Gamma-ray source, an ion beam source, a microwave source, an induction generator, and combinations thereof.

8. The process of claim 1 or 2, wherein said valve means comprises a pneumatically operated valve or a solenoid valve.

9. The process of claim 1 or 2, wherein said pressure differential exceeds one pound per square inch (psi) and its actual value is predetermined in accordance with the precursor fluid viscosity.

10. The process of claim 1 or 2, wherein said motion control means include servo means for indexing and positioning said dispensing head relative to said support member in at least two dimensions.

11. The process of claim 10, wherein said servo means provide indexing and positioning in a third dimension.

12. The process of claim 1 wherein said constant pressure differential is variable with the variations being achieved by using a compressed air source, a back-flow channel and a pressure-regulating needle valve.

13. The process of claim 1, 2, or 12, wherein said precursor fluid material comprises a volatile liquid ingredient selected from the group consisting of water, ethanol, methanol, acetone, and mixtures thereof.

14. The process of claim 1, 2, or 12, wherein said precursor fluid material comprises an ingredient selected from the group consisting of a polymeric, organic, organometallic, ceramic, glass, carbonaceous, metallic material, and combinations thereof.

15. The process of claim 1, 2, or 12, wherein said precursor fluid material is in a form or physical state selected from the group consisting of a melt, a solution, a suspension, a sol-gel, or a colloidal fluid.

16. The process of claim 1, 2, or 12, wherein said circuit component comprises a material selected from one of the following groups of materials:

(A) Metals, including silver, nickel, gold, copper, chromium, titanium, aluminum, platinum, palladium, and alloys thereof;

(B) Ceramics, including alumina ($Al_2O_3$), silica, glasses, and mixtures thereof;

(C) Dielectrics, including alumina, magnesium oxide (MgO), yttrium oxide ($Y_2O_3$), zirconium oxide ($ZrO_2$), and cerium oxide ($CeO_2$);

(D) Ferroelectrics, including barium titanate ($BaTiO_3$), strontium titanate ($SrTiO_3$), lead titanate ($PbTiO_3$), lead zirconate ($PbZrO_3$), potassium niobate ($KNbO_3$), strontium bismuth tantalate ($SrBi_2Ta_2O_9$), $(Ba,Sr)TiO_3$, and solid solution stoichiometric variations thereof;

(E) Piezoelectrics, including quartz, AlN, and lead zirconate titanate;

(F) Ferrites, including yttrium iron garnet ($Y_3Fe_5O_{12}$), barium zinc ferrite ($Ba_2Zn_2Fe_{12}O_{19}$), hexagonal ferrites, barium ferrite, spinel ferrites, nickel zinc ferrites, manganese zinc ferrite, and magnetite ($Fe_3O_4$);

(G) Electro-optical ceramics, including lithium niobate ($LiNbO_3$), lithium tantalate ($LiTaO_3$), cadmiun telluride (CdTe), and zinc sulfide (ZnS);

(H) Ceramic superconductors, including $YBa_2Cu_3O_{7-x}$ (YBCO), $T_2CaBa_2Cu_3O_{12}$, $La_{1.4}Sr_{0.6}CuO_3$, BiSrCACuO, BaKBiO, and halide doped fullerines;

(I) Chalcogenides, including SrS, ZnS, CaS, and PbS;

(J) Semiconductors, including Si, Ge, GaAs, and CdTe;

(K) Phosphors, including SrS:Eu, SrS:Ce, ZnS:Ag, $Y_2O_2$:Eu, and $Zn_2SiO_4$:Mn;

(L) Transparent conductive oxides, including indium tin oxide, zinc oxide, tin oxide, indium oxide, and mixture thereof; and (M) Bio- and chemical sensing elements.

17. The process of claim 1, 2, or 12, wherein said precursor fluid has a viscosity no less than 20 cps.

18. The process of claim 1, 2, or 12, wherein said valve means of said inkjet-based dispensing head comprises a mechanism selected from the group consisting of a piezoelectric element, a thermal actuation element, and a solenoid valve.

19. A direct write process for fabricating at least one desired circuit component onto a substrate surface of a microelectronic device according to a computer-aided design (CAD), said process comprising:

(a) providing a supply of a first precursor fluid material, with a viscosity no less than 10 cps, under a substantially constant but variable pressure differential relative to ambient pressure;

(b) dispensing said first precursor fluid material from at least an inkjet-based dispensing head onto said substrate surface of said device supported by a support member;

(c) during said dispensing step, moving said dispensing head and said support member or said substrate relative to one another in a plane defined by first and second directions to form said first precursor material into a desired pattern according to said design; and (d) concurrent with or subsequent to said dispensing and moving steps, operate a material treatment means to convert said first deposited pattern of precursor material into at least a portion of said at least one desired circuit component.

20. The process of claim 19, wherein said substantially constant but variable pressure differential is varied by a method comprising:

operating a pump means to deliver said precursor fluid material from a reservoir to said chamber, wherein said valve means, when switched on, allows said fluid material to be dispensed through said dispensing head and, when switched off, allows at least a portion of said fluid material to flow back to said reservoir through a flow channel; and operating a flow-regulating means to adjust a fluid material back-flow rate through said flow channel for maintaining a desired fluid material pressure inside said chamber.

21. The direct write process of claim 19 or 20, further comprising repeating steps (a) through (d) to dispense and deposit a second precursor fluid material of a second desired pattern onto said substrate surface and converting said second deposited precursor fluid material onto at least a second portion of said at least one component or a second component of said device.

22. The direct write process of claim 19 or 20, further comprising repeating steps (a) through (d) to deposit multiple components onto said substrate surface to form a first layer of said device.

23. The direct write process of claim 22, further including the steps of forming multiple layers of components on top of one another by repeated dispensing and converting of said precursor fluid materials as said dispensing head and said support member are moved relative to one another in one direction parallel to said plane, with said dispensing head and said support member being moved away from one another in said third direction by a predetermined layer thickness after each preceding layer has been formed.

24. The direct write process of claim 19 or 20, further including the steps of:

creating a geometry representation of said device on a computer, said geometry representation including a plurality of segments or data points defining said device;

generating programmed signals corresponding to each of said segments or data points in a predetermined sequence; and moving said dispensing head and said support member relative to one another in response to said programmed signals.

25. The direct write process of claim 19 or 20, wherein said moving step includes the step of moving said dispensing head and said support member relative to one another in a direction parallel to said plane according to a first predetermined pattern to dispense said precursor fluid material at a rate for forming an outer boundary of a component on said device substrate surface, said outer boundary defining an exterior surface of said component.

26. The direct write process of claim 25, wherein said outer boundary defines an interior space in said component and wherein a fluid material pressure is increased to a higher pressure level, and said moving step further includes the step of moving said dispensing head and said support member relative to one another in said direction parallel to said plane according to at least one other predetermined pattern to fill said interior space with said material at a higher rate.

27. The direct write process of claim 26, further comprising the steps of creating a geometry representation of said device on a computer, said geometry representation including a plurality of segments or data points defining said object, and generating programmed signals corresponding to each of said segments or data points in a predetermined sequence, wherein said programmed signals determine said movement of said dispensing head and said support member relative to one another in said first predetermined pattern and said at least one other predetermined pattern.

28. The direct write process of claim 1, 2, 19, or 20, wherein said substrate is selected from the group of flexible materials consisting of a plastic, elastomer, fabric, paper, composite, and combinations or mixtures thereof.

29. The direct write process of claim 28, wherein said substrate is prepared in a roll form.

30. The direct write process of claim 28, further comprising continuously or intermittently moving said substrate from a roll of substrate supply disposed at one side of said support member into a fabrication zone above said support member and then out of said fabrication zone upon deposition of said component.

31. The direct write process of claim 30, further comprising a step of collecting said substrate at another side of said support member to complete a roll-to-roll fabrication process.

32. A direct write apparatus for fabricating a desired circuit component onto a substrate surface of a microelectronic device according to a computer-aided design (CAD), said apparatus comprising:

(a) a support member for supporting thereon said device substrate;

(b) a fluid material delivery assembly comprising a chamber at a distance from said support member for containing a precursor fluid material under a substantially constant but adjustable pressure differential relative to the ambient pressure;

(c) an inkjet-based dispensing head in flow communication with said chamber, said head comprising on one end at least a discharge orifice of a predetermined size and a valve means in control relation to said at least a discharge orifice for dispensing droplets of said precursor fluid material through said orifice onto said substrate surface; and (d) machine control means in electronic communication with a computer and in control relation to both said support member and said dispensing head for generating control signals in response to coordinates of said design of the device and for controlling the position of said dispensing head relative to said support member in response to said control signals to control dispensing of said precursor material for fabricating said component.

33. The apparatus of claim 32, wherein said fluid material delivery assembly further comprises:

a fluid material reservoir containing therein a desired amount of said precursor fluid material, a pump means to deliver said precursor fluid material from said reservoir to said chamber;

a back flow channel having a first end in flow communication with said chamber and a second end in flow communication with said reservoir; and a flow-regulating means in control relation to said channel to adjust the material back-flow rate through said channel for maintaining a desired fluid material pressure inside said chamber.

34. The apparatus of claim 33, wherein said pump means comprises a gear pump.

35. The apparatus of claim 33, wherein said flow-regulating means comprises a needle-like valve positioned between said first end and said second end of said back flow channel to adjust an effective cross-section area of said back-flow channel through which said fluid material can back flow to said reservoir.

36. The apparatus of claim 33, wherein said flow-regulating means comprises a spring.

37. The apparatus of claim 35, further comprising an actuator means in control relation to said needle-like valve for adjusting the position of said needle-like valve relative to said back flow channel.

38. The apparatus of claim 32, wherein said fluid material delivery assembly further comprises:
 a material reservoir providing said fluid material to said chamber,
 a compressed air source exerting a pressure to said reservoir;
 a back flow channel having a first end in flow communication with said chamber and a second end in flow communication with said reservoir; and
 a flow-regulating means in control relation to said channel to adjust the material back-flow rate through said channel for maintaining a desired fluid material pressure inside said chamber.

39. The apparatus of claim 32, 33, or 38, further comprising a substrate feeder disposed at one side of and at a distance from said support member for feeding said substrate onto said support member.

40. The apparatus of claim 39, further comprising a substrate collector disposed at another side of and at a distance from said support member for collecting said substrate therefrom upon deposition of said component.

41. The apparatus of claim 39, wherein said feeder comprises a roller.

42. The apparatus of claim 40, wherein said collector comprises a roller.

* * * * *